(12) United States Patent
Brest

(10) Patent No.: US 6,520,383 B1
(45) Date of Patent: Feb. 18, 2003

(54) VESSEL WITH DUAL POUR SPOUTS

(76) Inventor: Iris Brest, 814 Tolman Dr., Stanford, CA (US) 94305

( * ) Notice: Subject to any disclaimer, the term of this patent is extended or adjusted under 35 U.S.C. 154(b) by 0 days.

(21) Appl. No.: 09/976,855

(22) Filed: Oct. 12, 2001

(51) Int. Cl.[7] ............................................. B67D 5/58
(52) U.S. Cl. ........................... 222/189.07; 222/189.08; 222/572; 210/467
(58) Field of Search ..................... 222/189.07, 189.08, 222/572, 465.1, 565, 478, 486; 210/467

(56) References Cited

U.S. PATENT DOCUMENTS

| | | | | |
|---|---|---|---|---|
| 367,250 A | * | 7/1887 | Sperry | 222/465.1 |
| 757,281 A | * | 4/1904 | Sachet | 222/189.07 |
| 1,336,491 A | * | 4/1920 | Stern | 222/189.07 |
| 2,216,407 A | * | 10/1940 | Bradford | 222/189.07 |
| 3,710,709 A | | 1/1973 | Roncarelli | 99/324 |
| 4,310,418 A | | 1/1982 | Busbey | 210/467 |
| 4,941,586 A | * | 7/1990 | Tarna | 222/572 |
| 5,388,732 A | | 2/1995 | Greger | 222/572 |
| D443,170 S | | 6/2001 | Brest | D7/315 |

* cited by examiner

Primary Examiner—Philippe Derakshani
(74) Attorney, Agent, or Firm—Mintz, Levin, Cohn, Ferris, Glovsky and Popeo, P.C.

(57) ABSTRACT

A vessel directed generally for cooking purposes comprising one pour spout or two opposing spouts is provided. The vessel comprises features to permit dispensing of hot or warm liquids from the vessel without the risk of scalding or burning from escaping steam. In particular, the vessel comprises a handle attached to the vessel at about 90° from one or both pour spouts. In the case of two pour spouts, each pour spout is attached to the vessel at about 180° from the other pour spout. The relative position of the handle to each pour spout forms a 90° angle with respect to a vertical center-line of a bottom surface of the vessel. The 90° angle enables steam escaping from the vessel during dispensing of hot or warm contents to be directed way from a user's pouring hand and diverted as a smooth, non-turbulent stream. The vessel of the invention comprises other features to permit dispensing and draining of contents from the vessel without the use of additional equipment or utensils.

20 Claims, 8 Drawing Sheets

VESSEL WITH DUAL POUR SPOUTS

FIELD OF THE INVENTION

The invention is directed generally to a vessel with one or two pour spouts. In particular, the invention provides a cooking vessel with one pour spout, or two opposing pour spouts, comprising features to permit dispensing of hot or warm liquids from the vessel without the risk of scalding or burning from escaping steam. In addition, the invention provides a cooking vessel with one pour spout, or two opposing pour spouts, comprising features to permit dispensing and draining of contents from the vessel without the use of additional equipment or utensils.

BACKGROUND OF THE INVENTION

The prior art discloses a variety of cooking vessels with one or two pour spouts to aid in dispensing, draining or straining liquid from contents contained in a vessel during food preparation. In particular, cooking vessels with two pour spouts are often constructed for a specific purpose or cooking technique, such as a flambéing utensil disclosed in U.S. Pat. No. 3,710,709. The flambéing utensil includes a central supply bowl, two smaller opposing priming bowls with pouring lips attached to a rim of the central supply bowl and an intermediate handle. The priming bowls provide means to ignite and introduce an alcoholic flambéing liquid to the supply bowl and to dispense the flaming liquid onto food.

Other prior art cooking vessels with two pour spouts include pour spouts with a specific configuration to facilitate clean, safe and reliable use, such as the vessel disclosed in U.S. Pat. No. 5,388,732. This vessel includes opposing pour spouts with a configuration that causes liquid dispensed from the vessel to flow in the shape of a convex-side V. The shape of the flow pattern provides a uniform, non-turbulent flow of liquid contents from the vessel that essentially eliminates unwanted lapping or dripping of liquids onto the exterior surface of the vessel.

Prior art cooking vessels also include various constructions and configurations to enable a vessel to serve as a drainer for removal of liquid and fine particles from contents contained in the vessel or to serve as a strainer for separating fine and coarse food particles. Such vessels include sieve-like configurations, such as the vessel disclosed in U.S. Pat. No. 4,310,418, wherein a lid of the vessel includes a radial flange that extends from the lid and includes a plurality of perforations. When the lid is attached to the vessel and the perforations are disposed across a pour spout, the lid serves to drain liquid or strain contents from the vessel.

However, none of the prior art cooking vessels described above includes features for handling potentially scalding or burning steam generated by dispensing or pouring hot or warm contents from a vessel. The vessel disclosed in U.S. Pat. No. 5,388,732 includes dual pour spouts having a configuration that provides a non-turbulent flow of liquids. However, such a pour spout configuration does not provide for steam escaping from the vessel during dispensing of hot or warm contents. In addition, the dual spout prior art vessels described above do not include means such as a securely-fitting lid that would allow a user to dispense contents from the vessel without manually holding the lid securely to the vessel with his or her non-pouring hand.

Thus, there is a need for a cooking vessel with a pour spout comprising features that help direct or divert potentially scalding or burning steam away from a user's hands during dispensing of hot or warm contents from the vessel. In addition, there is a need for a cooking vessel with a lid that fits securely to the vessel such that a tight seal between the vessel and lid is formed to permit a user to dispense hot or warm contents from the vessel without manually holding the lid to the vessel. Such a vessel and lid combination eliminates or at least reduces the risk of a user burning or scalding his or her non-pouring hand from steam escaping from the vessel during dispensing. In addition, such a vessel and lid combination further comprising sieve-type features or configurations for draining liquid or straining contents from the vessel eliminates the need for additional equipment or cooking utensils, such as a sieve, colander or strainer to drain liquid and/or strain fine particles from contents contained within the vessel. There is also a need for a cooking vessel comprising two opposing pour spouts such that the vessel and lid combination permits a user to dispense hot or warm contents from the vessel with a preferred hand without the need to hold the lid to the vessel during dispensing.

SUMMARY OF THE INVENTION

Embodiments of the invention provide a vessel for dispensing contents comprising one or two opposing pour spouts that overcomes the deficiencies of the prior art vessels discussed above.

A first embodiment according to the invention provides a vessel comprising a bottom surface and an upstanding peripheral side wall that extends upward from the bottom surface. The side wall has a diameter and terminates into a rim portion of the vessel. The vessel further comprises two opposing pour spouts joined to the side wall with a lower end of each pour spout positioned at a predetermined distance above the bottom surface. Each of the pour spouts is joined to the side wall at about 180° from the other pour spout. Each of the pour spouts has a pouring surface that extends outwardly from and peripherally about the side wall from a point of attachment to the side wall to define a depth. In addition, each of the pour spouts has a plurality of perforations formed integral with the side wall in an area defined by the point of attachment of the pouring surface.

The vessel also comprises a handle joined to the side wall at about 90° from each pour spout. The position of the intermediate handle relative to each pour spout essentially forms a 90° angle with respect to a vertical center-line of the bottom surface of the vessel. As described in further detail herein, the position of the intermediate handle relative to the position of each pour spout helps direct and divert steam escaping through an open pour spout away from a user's hand during dispensing of hot or warm contents from the vessel, thereby eliminating or at least substantially reducing the risk of burning or scalding.

In the first embodiment, the side wall of the vessel includes a convex surface and a circular cross-section. However, the convex shape of the vessel is not limiting. In other embodiments of the vessel according to the invention, the side wall may comprise other shapes or configurations as required or desired. In addition, in one embodiment of the vessel according to the invention, the vessel has an opening to provide fluid communication between the interior of the vessel and the pour surface instead of the plurality of perforations.

In the first embodiment, the plurality of perforations includes an array of circle-shaped openings having similar diameters. In other embodiments of the vessel according to the invention, the plurality of perforations may comprise perforations or openings of other geometries, shapes or configurations as required or desired.

The vessel further comprises a removable lid including a top surface, a knob centrally joined to the top surface for grasping the lid, and an annular peripheral flange integral to a perimeter edge of the top surface that extends downwardly for a predetermined distance from the top surface. The peripheral flange is sized and configured such that the side wall of the vessel telescopically receives the peripheral flange when the lid is attached to the vessel. The lid also comprises an annular seating ridge at the intersect of the top surface and the peripheral flange to seat the lid on the rim portion when attached to the vessel.

The lid further comprises a lateral extension extending laterally from the perimeter edge of the top surface to form a flap-type lid extension. The lateral extension is sized and configured such that when the lid is attached to the vessel the lateral extension can align with an upper perimeter rim of either pouring surface to cover an exposed area defined by the upper rim.

When the lid is attached to the vessel, the peripheral flange is positioned flush against an inner perimeter of the rim portion of the vessel. The peripheral flange forms a seal between the lid and the vessel such that the lid remains attached to the vessel during dispensing of contents from the vessel without requiring a user to manually secure or hold the lid to the vessel with his or her non-pouring hand. Even when the vessel is rotated more than 90° about a center horizontal axis of the handle, the lid remains attached to the vessel during dispensing without requiring it to be manually secured or held to the vessel. This feature is particularly advantageous when a user is dispensing hot or warm contents from the vessel. Without requiring the user to employ his or her non-pouring hand to hold the lid to the vessel, the risk of burning or scalding from escaping steam is essentially eliminated or at least substantially reduced.

Although the peripheral flange is sized and configured to form a tight seal between the lid and the vessel, the lid is readily adjustable and can be rotatably positioned on the vessel to permit the lateral extension to completely or partially cover the exposed area of either pouring surface as desired or required.

When the lid is attached to the vessel, steam escaping from the open dispensing pour spout is substantially directed or diverted away from the non-dispensing pour spout and the pouring hand of the user. As steam is produced within the vessel, steam generally flows upward toward the lid in a substantially perpendicular orientation. As steam encounters the lid and lateral extension, steam is generally directed toward and through the open pour spout. The 90° angle formed with respect to the vertical center-line of the bottom surface of the vessel as a result of the relative positions of the intermediate handle and pour spouts helps direct and divert escaping steam away from the open pour spout and the pouring hand of the user in a substantially smooth and non-turbulent stream. Thus, the position of the intermediate handle relative to the open pour spout eliminates or at least substantially reduces the risk of scalding or burning the user's hands during dispensing of hot or warm contents from the vessel.

A second embodiment of the vessel according to the invention provides a vessel as described above comprising a single pour spout positioned about 90° from the handle.

A third embodiment of the vessel according to the invention provides a vessel as described above comprising a single pour spout positioned about 90° from the handle having a pouring surface that extends outwardly from and peripherally about the side wall from a point of attachment to define a depth and an opening below the rim portion of the vessel, the opening providing fluid communication between the interior of the vessel and the pouring surface.

A fourth embodiment of the vessel according to the invention provides a vessel as described above comprising a side wall having an annular shape of about equal diameter between a rim portion and a bottom surface and a circular cross-section. The vessel further comprises two opposing pour spouts attached to the side wall with each pour spout located about 180° from the other pour spout. Each pour spout includes a pouring surface comprising two planar surfaces. The planar surfaces extend outwardly from and about the side wall at an angle from a point of attachment to the side wall to define a depth. The planar surfaces eventually merge and terminate into an apex. Each pouring surface includes a concave-shaped pouring lip formed in an upper perimeter rim of each pouring surface. Each pouring surface further includes a perforated area defined by the point of attachment to the side wall of the vessel and comprising a plurality of perforations formed therein.

BRIEF DESCRIPTION OF THE DRAWINGS

For a better understanding of the invention, reference is made to the drawings, which are incorporated herein by reference and in which.

DETAILED DESCRIPTION OF THE INVENTION

Figure 1:
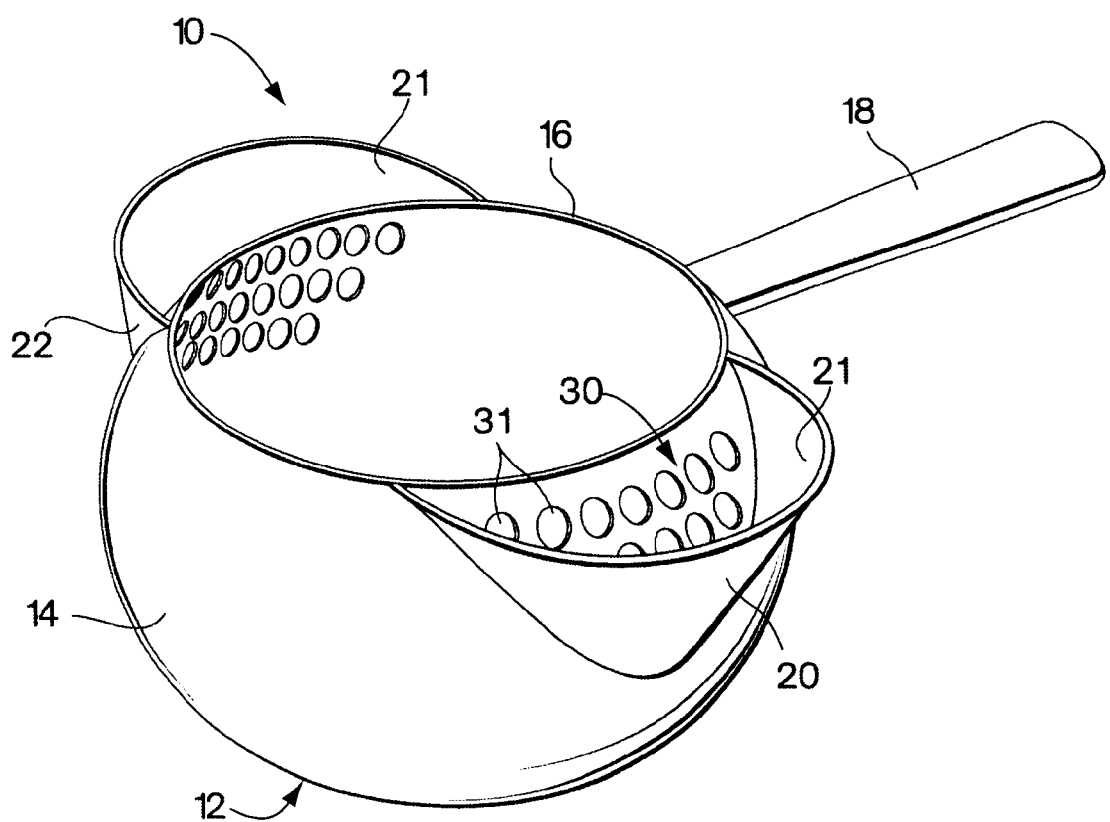
FIG. 1 is a perspective view of a first embodiment of a vessel with two pour spouts according to the invention.

Illustrative embodiments of the invention described below provide a vessel for use in heating and cooking liquids that contain a wide range of food particles. A first embodiment of the vessel comprises two opposing pour spouts adapted to allow transferring of liquids and draining or straining of liquid or fine food particles from other foods and/or liquids contained in the cooking vessel. Each pour spout is joined to the vessel at about 180° from the other pour spout. Each pour spout comprises a pouring surface and a perforated area defined by the point of attachment of each pouring surface to a side wall of the vessel to permit draining of liquid or straining of food particles from contents contained in the vessel. The vessel further includes an intermediate handle joined to the side wall of vessel at about 90° from each pour spout. In addition, the vessel includes a lid with a lateral extension that can cover either fully or partially an exposed area defined by the pouring surface of either pour spout when the lid is attached to the vessel.

A feature and advantage of the vessel according to the invention is that when the lid is attached to the vessel and the non-dispensing pour spout is covered by the lateral extension, the 90° angle created by the relative position of the intermediate handle to the dispensing pour spout helps direct steam through the open dispensing pour spout in a substantially smooth and non-turbulent stream. In addition, the 90° angle of the handle to the dispensing pour spout also helps divert escaping steam away from a user's pouring hand, thereby eliminating or at least reducing the risk of scalding or burning. In addition, the lid fits securely to the vessel to form a tight seal between the vessel and lid such that during dispensing the lid does not need to be manually held to the vessel by a user's non-pouring hand, thereby essentially eliminating or at least further reducing the risk of burning or scalding the user's hands during dispensing of hot or warm contents.

Embodiments of the invention are described below with reference to FIGS. 1–9, which are presented for the purpose of illustrating embodiments and are not intended to limit the scope of the claims. The term "tight", as used herein to describe a seal achieved between a vessel and a lid, refers to of such close construction as to be impermeable especially to liquids.

Referring to FIGS. 1–5, a first embodiment of the invention provides a vessel 10 comprising a bottom surface 12 with an upstanding peripheral side wall 14 extending upward from the bottom surface 12 having an inside diameter and a circular cross-section. The side wall 14 extends upward from the bottom surface 12 as a convex surface that curves or bulges outward from the bottom surface 12 to a predetermined distance $H_1$ above the bottom surface 12 at which point the side wall 14 makes a gradual transition tapering inward to merge with an upper rim portion 16. Although the vessel 10 of the first embodiment includes the side wall 14 having a convex shape or profile, it is understood that in other embodiments of the vessel according to the invention the side wall 14 may have other shapes and configurations as required and desired.

Figure 5:
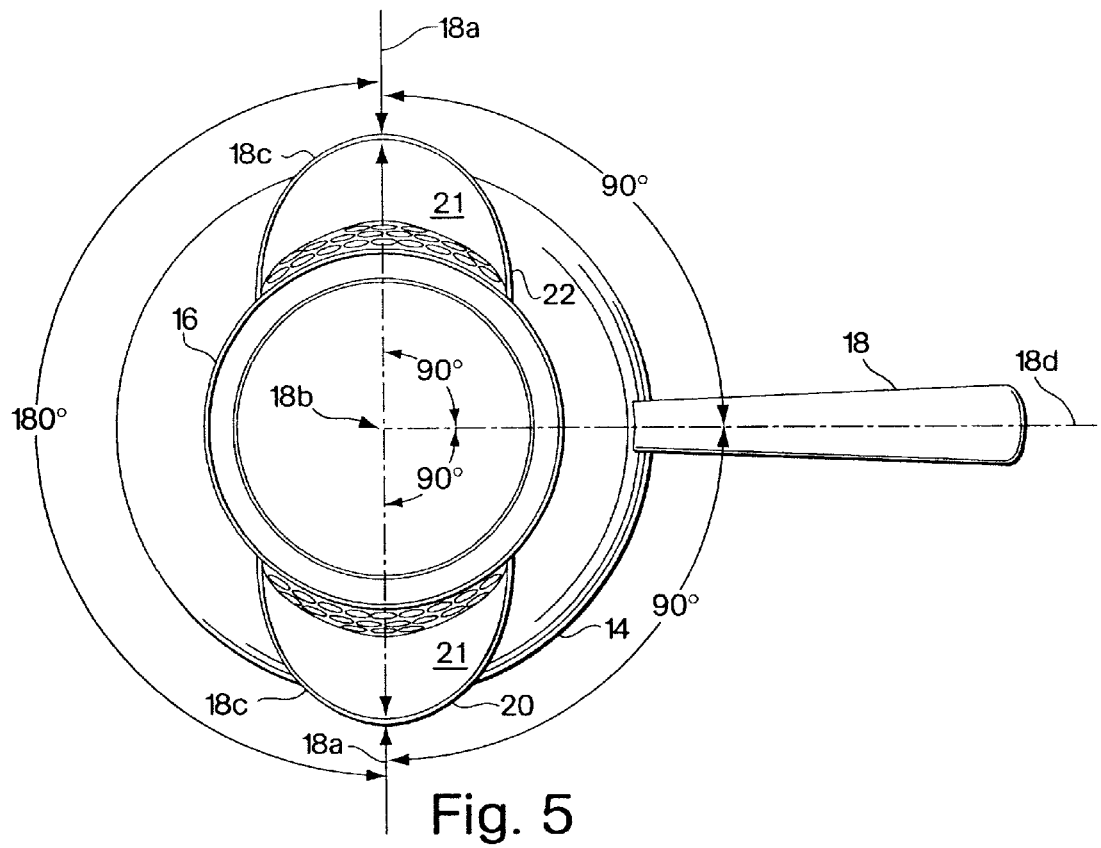
FIG. 5 is a top view of the vessel of FIG. 1 illustrating the relative positions of the two pour spouts to a handle.

The vessel 10 further comprises a first pour spout 20 and a second pour spout 22 each of which are joined to an upper portion of the side wall 14 and extend outwardly from a point of attachment to the side wall 14. The first pour spout 20 is located about 180° from the second pour spout 22. A handle 18 is joined to the upper portion of the side wall 14 by any suitable method known in the art to enable manipulation of the vessel 10. As shown in FIG. 5, the handle 18 is located about 90° from each of the pour spouts 20 and 22.

A feature and advantage of the vessel 10 with the first and second pour spouts 20 and 22 is the choice provided to users to grasp the handle 18 with either their dominant hand or their less dominant hand, or both hands, to dispense contents from the vessel 10. Users may prefer to grasp the handle 18 with their less dominant hand, allowing their dominant hand to be free to perform other functions or cooking activities, while dispensing contents from the selected pour spout. Users may also grasp the handle 18 with their dominant hand to dispense contents from the vessel 10. Since it is unnecessary to use a hand to hold the lid on the vessel, users may also grasp the handle 18 with both hands, in instances when the contents of the vessel are heavy, to dispense contents from the vessel. The vessel having the first and second pour spouts 20 and 22 also has the advantage of allowing users who have use of only one particular hand or arm to dispense contents from the vessel 10 from the pour spout suitable for their particular use.

Figure 2:
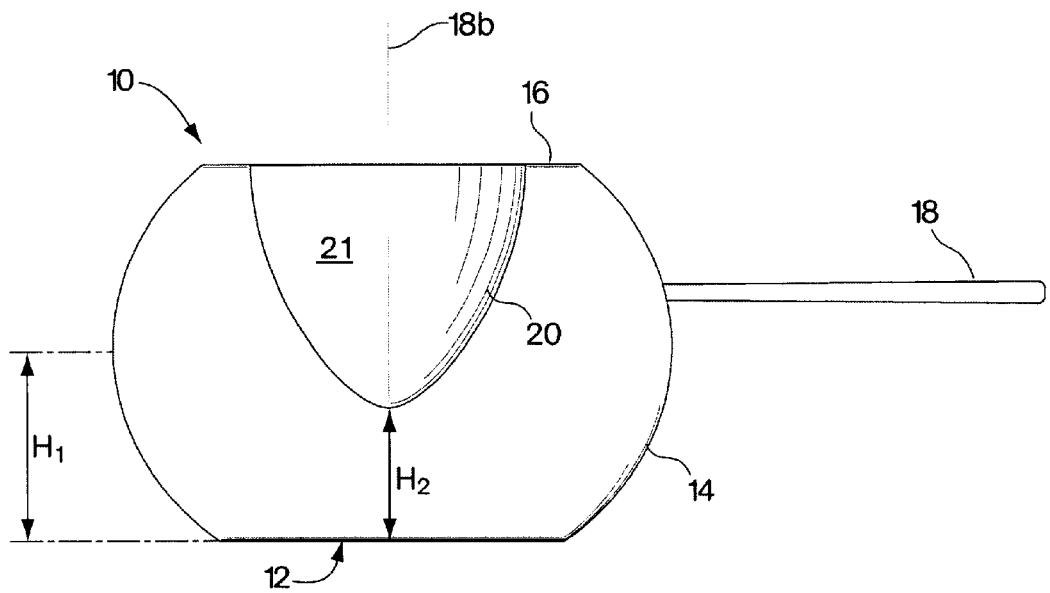
FIG. 2 is a side elevational view of the vessel.
Figure 3:
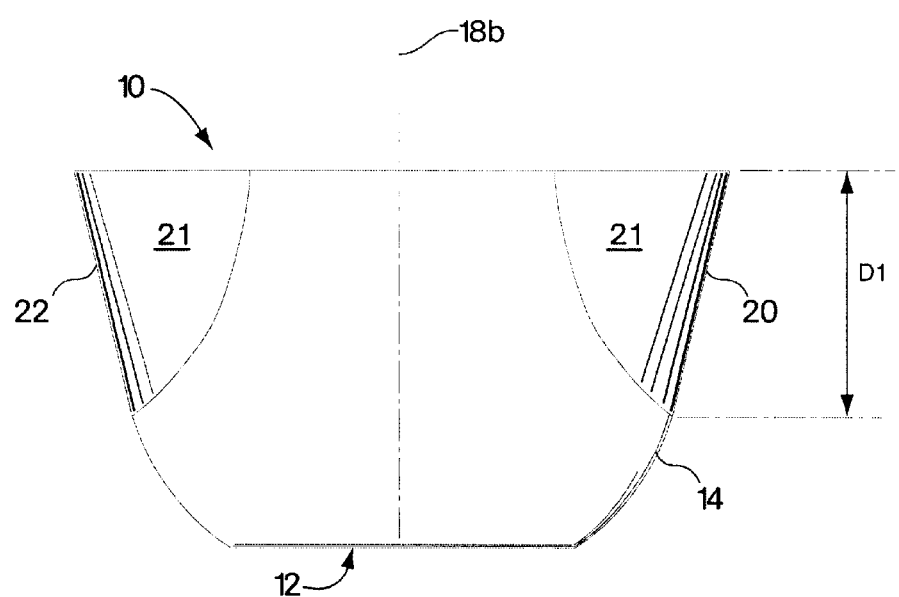
FIG. 3 is a front elevational view of the vessel of FIG. 1.
Figure 4:
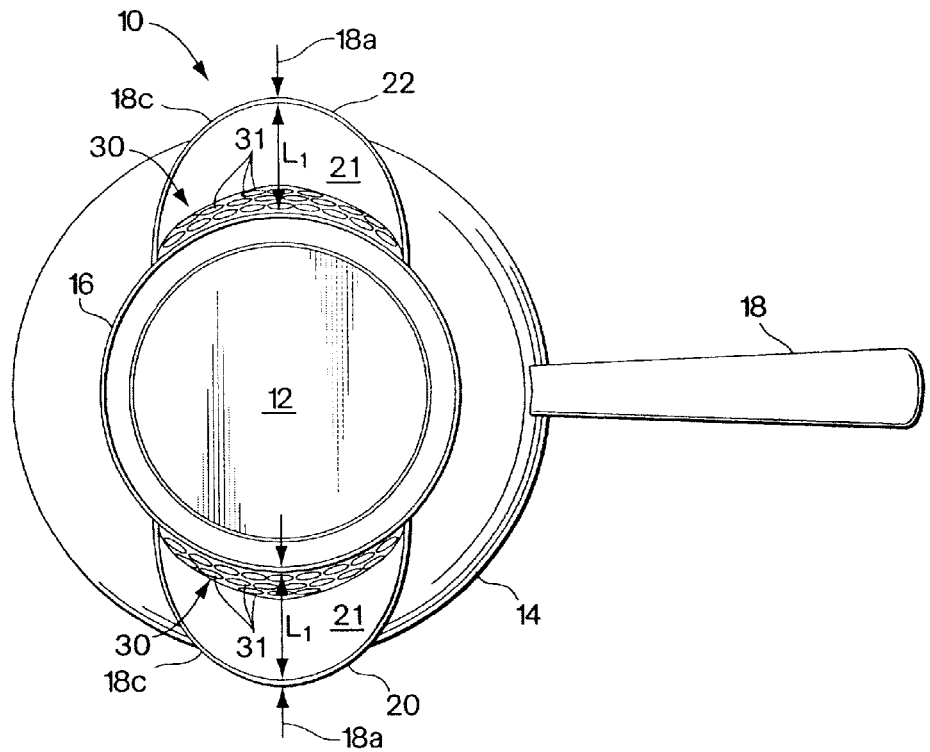
FIG. 4 is a top view of the vessel of FIG. 1.

As shown in FIGS. 1–5, each of the pour spouts 20 and 22 includes a pouring surface 21 extending outwardly from and peripherally about the side wall 14 from a point of attachment of the pouring surface 21 to the side wall 14. Each of the pour spouts 20 and 22 further comprises a perforated area 30 of the side wall 14 defined by the point of attachment of the pouring surface 21 to the side wall and having a plurality of perforations 31 formed therein. The pouring surface 21 is defined by vertical and horizontal components. As shown in FIGS. 2 and 3, the vertical components of each pouring surface 21 include a concave-shaped extension projecting outwardly from the side wall 14 to define a depth $D_1$ of each pour spout. As shown in FIG. 4, the horizontal components include the curvature of the pouring surface 21 projecting outwardly from the side wall to define a length $L_1$ from the rim portion 16 of the vessel to an outermost portion 18a of an upper rim 18c of each pouring surface 21. A lower end of each of the first and second pour spouts 20 and 22 is positioned at a predetermined distance $H_2$ above the bottom surface 12 of the vessel 10. Although the pouring surface 21 shown in FIGS. 1–5 includes a concave-like shape and configuration, each pouring surface 21 of the vessel according to the invention is not limited to any particular shape and configuration and may include other shapes and configurations as required and desired.

As shown in a top view of the vessel of FIG. 5, the handle 18 is located intermediate between the first and second pour spouts at about 90° from the outermost portion 18a of the upper rim 18c of each pouring surface and extends from the vessel in a substantially horizontal orientation. The intermediate position of the handle relative to each pour spout forms a 90° angle with respect to a vertical center-line 18b of the bottom surface of the vessel. As described in further detail herein, a feature and advantage of the position of the handle relative to each pour spout, and, hence, the 90° angle formed by such positions with respect to the vertical centerline of the bottom surface of the vessel, is that steam escaping from an open dispensing pour spout is directed and diverted away from the dispensing pour spout and a user's pouring hand during dispensing of hot or warm contents from the vessel.

As shown in FIGS. 1, 4 and 5, the perforated area 30 includes the plurality of perforations 31 comprising one or more openings or perforations arranged in an array or pattern placing each pour spout 20 and 22 in fluid communication with the interior of the vessel 10. Each opening or perforation may be of a particular shape and size as required to accommodate the size and/or the intended use of the vessel 10. In the first embodiment of the vessel according to the invention, the plurality of perforations 31 comprises an array of circle-shaped openings with about equal diameters. However, it is understood that in other embodiments of the vessel according to the invention, the perforations or openings may be other geometries, shapes and configurations as necessary to vent the interior of the vessel 10, or to drain contents or strain liquid from whatever material is contained in the vessel 10. Perforations or openings having narrow diameters may be used to drain or strain finer foods, while openings having wide diameters may be used to drain or strain coarser foods.

Figure 6A:
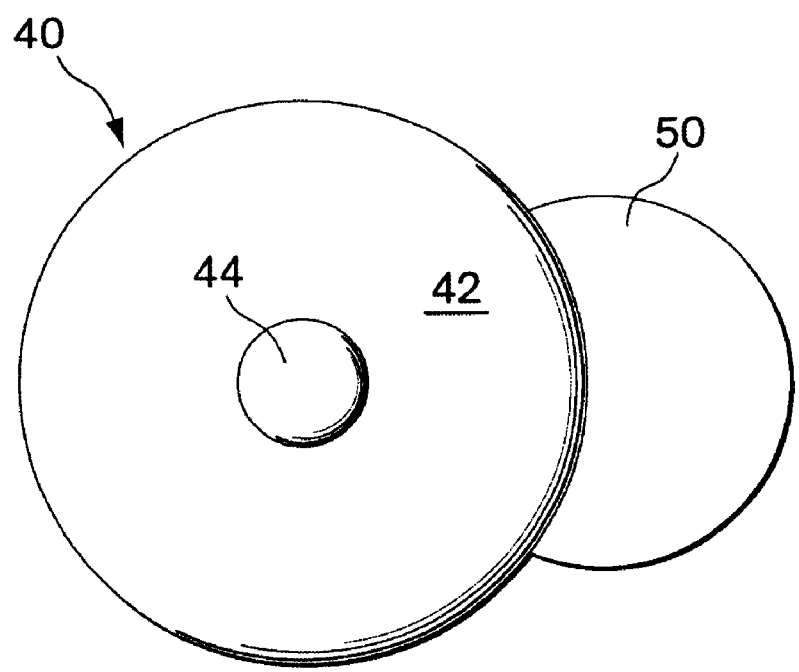
FIG. 6A is a top view of a lid to the vessel with a lateral extension.
Figure 6B:
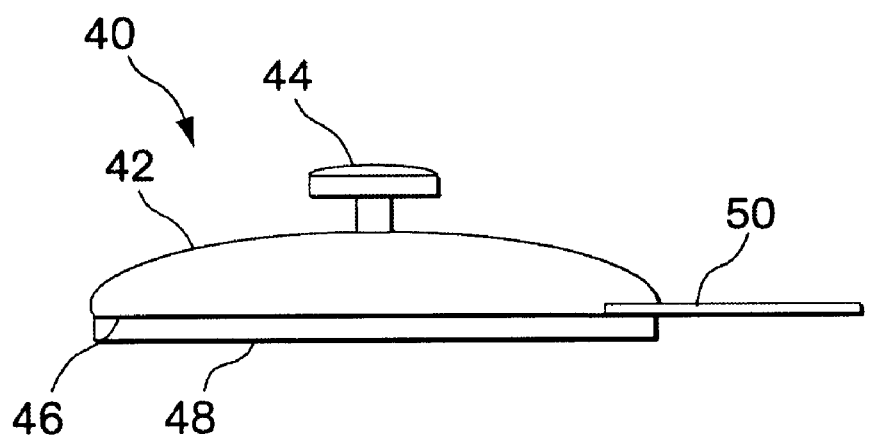
FIG. 6B is a side elevational view of the lid of FIG. 6A.

Referring to FIGS. 6A–6B, the vessel 10 further comprises a removable lid 40 sized and configured to be received by the vessel 10 and to fit securely within the side wall 14. The lid 40 includes a circular, convex-shaped top surface 42 with a knob 44 centrally joined thereto for grasping the lid 40. The lid 40 further includes an outer annular seating ridge 46 and an annular peripheral flange 48. The peripheral flange 48 is integral with a perimeter edge of the top surface 42 and extends downwardly from the top surface for a predetermined distance. The peripheral flange 48 is sized and configured such that the side wall 14 telescopically receives the peripheral flange when the lid is attached to the vessel. The outer seating ridge 46 is seated against the rim portion 16 of the vessel when the lid is attached to the vessel. When attached to the vessel, the peripheral flange 48 is flush against an inner perimeter of the rim portion 16 to form a secure and tight seal between the lid and the vessel. The seal between the lid and vessel permits a user to dispense or pour contents from the vessel without requiring the user to employ his or her non-pouring hand to manually hold or secure the lid against the vessel during dispensing. In one embodiment, the seal between the lid and the vessel can be formed and further secured by providing a peripheral flange having a circumference almost equal to a circumference of an opening of the vessel or the rim portion such that some manual force must be used to attach the lid to the vessel. In one embodiment, the seal between the lid and the vessel can be formed and further secured by protruding stippling or bumps disposed on a surface of the peripheral flange that lays flush against the inner perimeter of the rim portion. In other embodiments of the invention, the seal between the lid and the vessel can be formed and further secured by other methods or means well known in the art for securing the lid into or on the vessel. Although the peripheral flange 48 of the lid is in a close-fitting relationship with the inner perimeter of the rim portion 16 of the vessel, the lid is readily removed and adjusted on the vessel.

Figure 7:
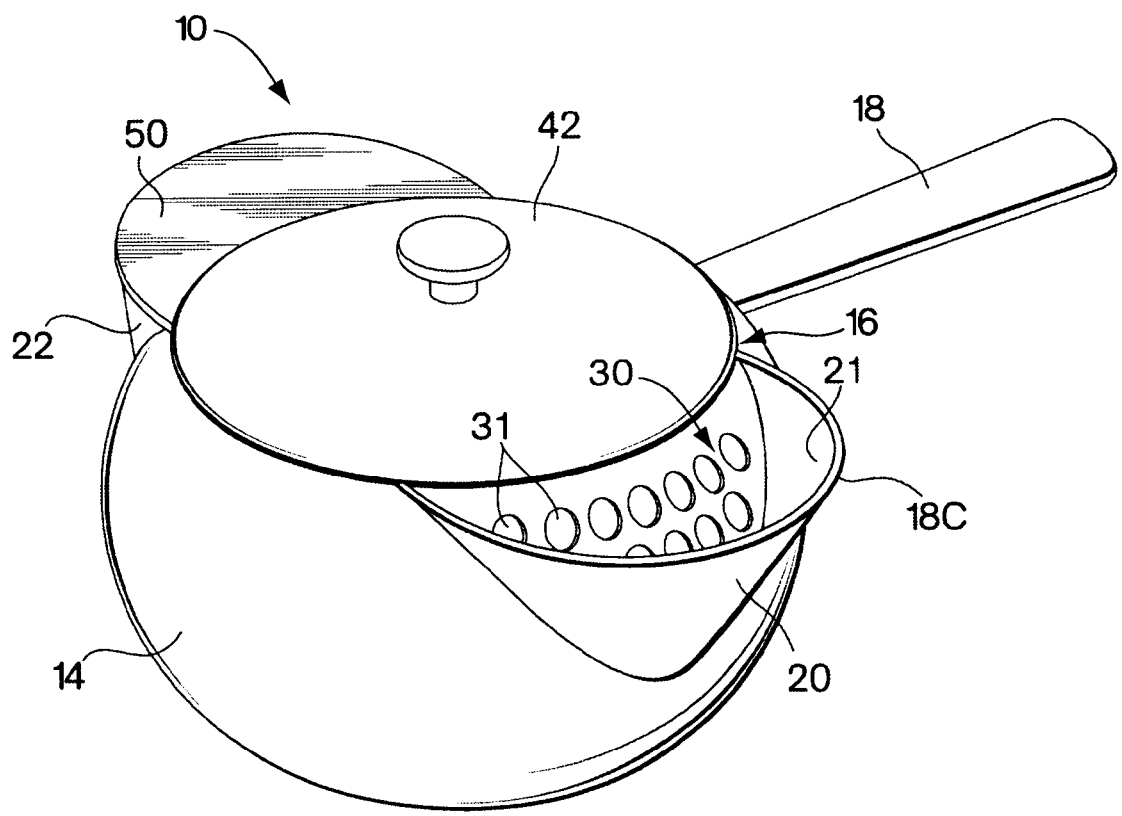
FIG. 7 is a perspective view of the lid of FIG. 6A attached to the vessel of FIG. 1.

The lid 40 further includes a lateral extension 50 integral with the top surface 42 of the lid that extends laterally from the lid at a point above or at the seating ridge 46. The lateral extension 50 is a flap-type extension that is sized and configured to cover an area defined by the upper rim 18c each pouring surface. As shown in FIG. 7, when the lid is attached to the vessel 10, the lateral extension 50 can be aligned with the upper rim 18c of either pour spout 20 and 22 to cover an exposed area defined by the upper rim.

A feature and advantage of the secure and tight seal formed between the lid and the vessel is that the seal permits a user to dispense contents from the vessel using one or both hands to grasp the handle. The user does not need to use his or her non-pouring hand to manually hold the lid securely to or against the vessel to insure that the lid remains attached to the vessel during dispensing. The seal between the lid and the vessel enables the vessel to be rotated more than 90° about a center horizontal axis 18d of the handle, as shown in FIG. 5. This feature of the vessel is advantageous when dispensing hot or warm liquids from the vessel. Without requiring a user to employ their free hand to manually secure the lid to the vessel during dispensing, the risk of the user burning or scalding their non-pouring is essentially eliminated or at least substantially reduced.

Another feature and advantage of the lid with the lateral extension is that the lid and lateral extension help direct and divert steam escaping from an open dispensing pour spout away from a user's pouring hand during dispensing of hot or warm contents from the vessel.

Furthermore, another feature and advantage of the vessel is the 90° angle created by the position of the intermediate handle relative to the open dispensing pour spout, as described above, helps vent escaping steam from the dispensing pour spout in a substantially smooth and non-turbulent stream. Steam produced within the vessel generally flows upward toward the lid in a substantially perpendicular orientation. As escaping steam encounters the lid and the lateral extension during dispensing, the 90° angle of the handle relative to the dispensing pour spout helps direct and divert escaping steam away from the vessel and the user's pouring hand, thereby eliminating or at least reducing the risk of burning or scalding.

The vessel 10 and the lid 40 are constructed of any suitable material such as, although not limited to, aluminum or stainless steel or any other sufficiently rigid, heat-resistant and rust-resistant material. In one embodiment, the top surface of the lid, and optionally the lateral extension, is constructed of glass and the peripheral flange is constructed of a suitable material such as aluminum or stainless steel. The glass top surface of the lid permits the user to view contents of the vessel during use. In other embodiments of the vessel according to the invention, the vessel further comprises a non-stick interior surface, such as a polytetrafluoroethylene-based coating or TEFLON®. Still in further embodiments of the vessel according to the invention, the vessel also comprises an exterior coating such as enamel or other protective and/or aesthetic coating material. The handle 18 is constructed of any suitable, non-heat conductive material.

Figure 8:
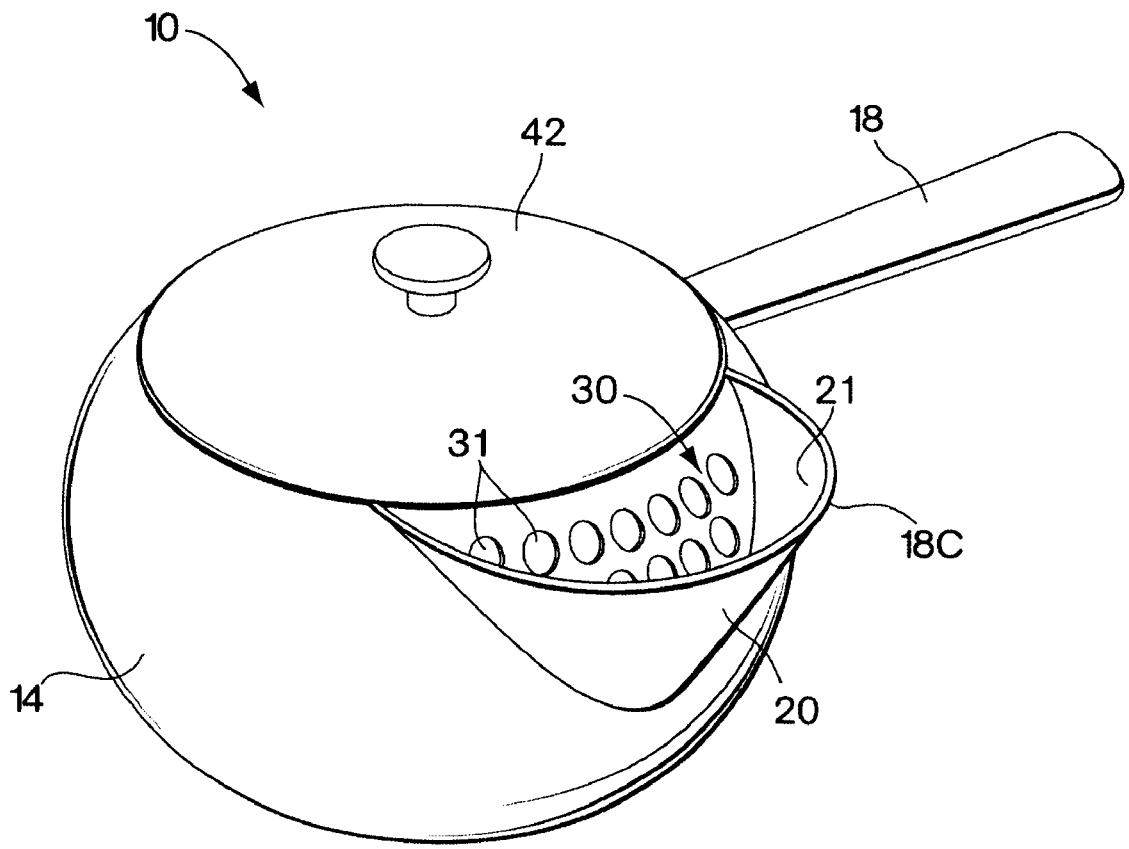
FIG. 8 is a perspective view of a second embodiment of the vessel according to the invention including a single pour spout.

Referring to FIG. 8, a second embodiment of the vessel 10 according to the invention comprises a vessel substantially similar to the vessel of the first embodiment comprising a single pour spout 20 located about 90° from the handle 18. In another aspect of the second embodiment, the pour spout can be located at about 90° from the handle on an opposing side of the vessel than that shown in FIG. 8 to accommodate use by a left-handed person.

Figure 9:
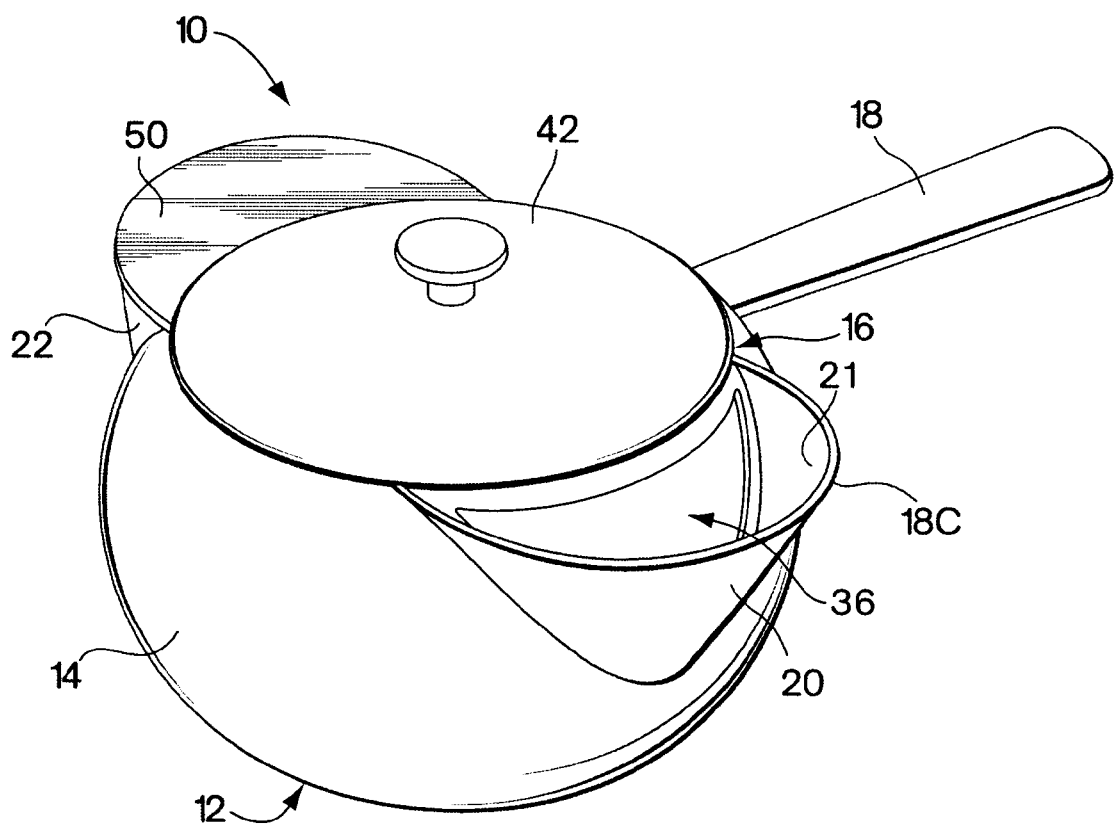
FIG. 9 is a perspective view of a third embodiment of the vessel according to the invention.

Referring to FIG. 9, a third embodiment of the vessel according to the invention comprises a vessel 10 substantially similar to the vessel of the first embodiment comprising two opposing pour spouts 20 and 22 located about 180° from one another and 90° from an intermediate handle 18, each pour spout having a pouring surface 21. The pouring surface extends outwardly and peripherally about a side wall 14 to define a depth of each pour spout and an opening 36 below a rim portion 16 of the vessel. The opening 36 is an alternative to the plurality of sieve-type configurations described above and provides fluid communication between the interior of the vessel and each pouring surface of each pour spout.

Figure 10:
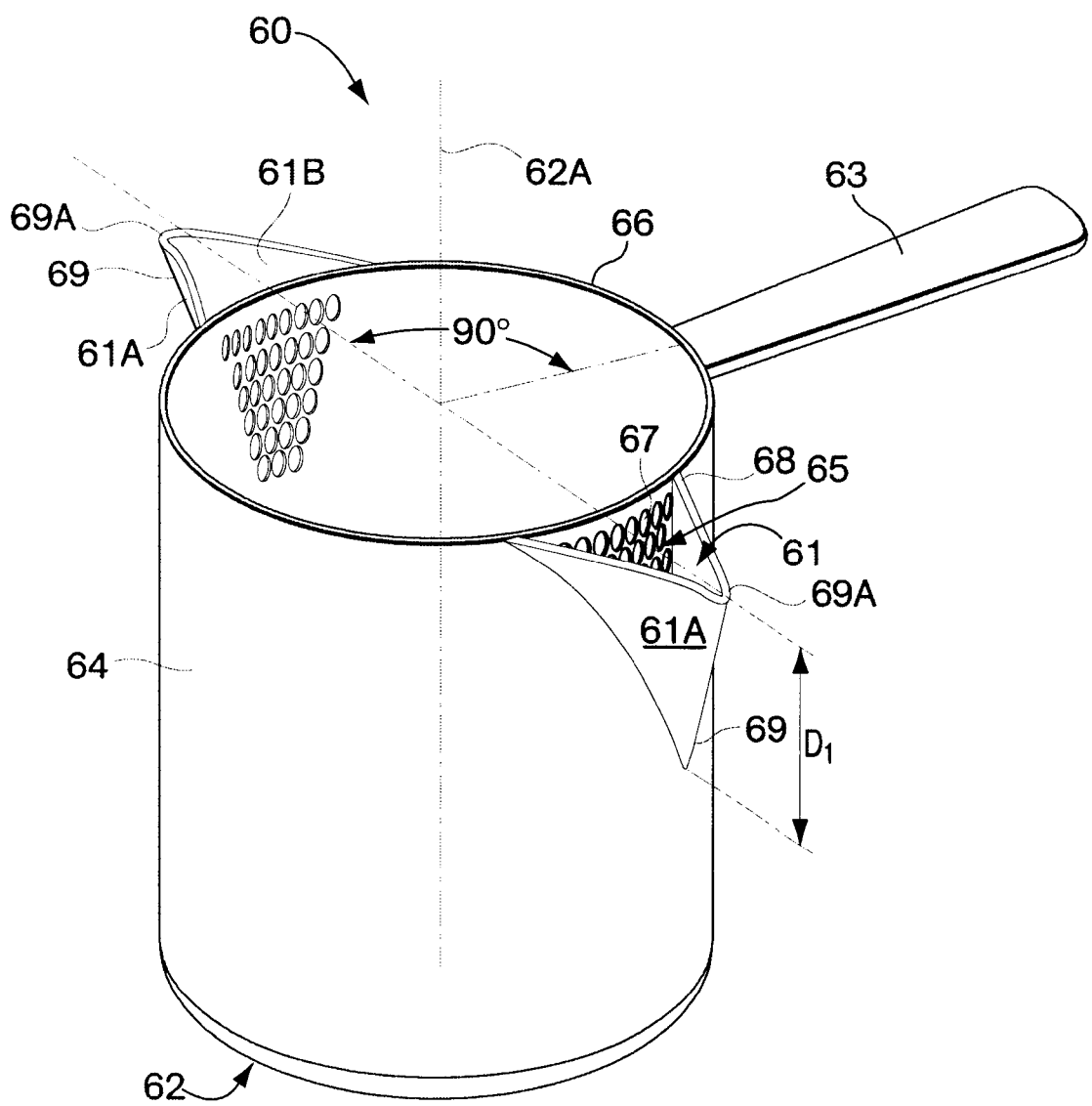
FIG. 10 is a perspective view of a fourth embodiment of the vessel according to the invention.

Referring to FIG. 10, a fourth embodiment according to the invention provides a vessel 60 as described above in the first embodiment comprising a side wall 64 with an annular-shape of about equal diameter between a rim portion 66 and a bottom surface 62, and a circular cross-section. The vessel 60 further comprises a first pour spout 68A and a second pour spout 68B. Each pour spout comprises a pouring surface 61 formed of two planar surfaces 61A and 61B. The planar surfaces 61A and 61B extend outwardly from and about the side wall 64 at an angle from a point of attachment to the side wall 64 to define a depth $D_1$. The planar surfaces 61A and 61B eventually merge and terminate in an apex 69. A concave-shaped pouring lip 69A is formed in an upper perimeter rim of each pouring surface 61. Each pour spout 68A and 68B further includes a perforated area 65 defined by the point of attachment of the pouring surface 61 to the side wall 64 that includes a plurality of perforations 67 formed therein. Each pour spout 68A and 68B is located about 180° from the other pour spout. A handle 63 is joined to the upper portion of the side wall 64 by any suitable method known in the art to enable manipulation of the vessel 60. The handle 63 is located between each pour spout at about 90° from each pour spout. As shown in FIG. 9, the position of the intermediate handle 63 relative to each pour spout forms a 90° angle with respect to a vertical center-line 62A of the bottom surface 62 of the vessel. Although the vessel described herein and shown in FIG. 10 includes the vessel 60 with a height larger than its width, the dimensions of the vessel are not limiting. It is understood by those skilled in the art that the vessel can accordingly include other shapes and dimensions as required or desired.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A vessel comprising:
   a bottom surface;
   an upstanding peripheral side wall that extends upward from the bottom surface having a diameter;
   two opposing pour spouts, each pour spout joined to the side wall at about 180° from the other pour spout,
   each pour spout having a pouring surface that extends outwardly from and peripherally about the side wall from a point of attachment to the side wall to define a depth;
   a handle joined to the side wall at about 90° from each pour spout; and
   a removable lid including
      a top surface,
      a knob centrally joined to the top surface for grasping the lid,
      an annular peripheral flange extending downwardly from a perimeter edge of the top surface for a predetermined distance, the peripheral flange being sized and configured to be telescopically received within the side wall of the vessel, and
      a lateral extension extending laterally from the top surface, the lateral extension being sized and configured such that when the lid is attached to the vessel the lateral extension can cover an area defined by an upper rim of the pouring surface.

2. The vessel of claim 1 wherein the lid further comprises an annular seating ridge at an intersect of the top surface and the peripheral flange to seat the lid on the rim portion of the vessel when the lid is attached to the vessel.

3. The vessel of claim 1 wherein the peripheral flange is sized to lay flush against an inner perimeter of the rim portion of the vessel when the lid is attached to the vessel.

4. The vessel of claim 3 wherein the peripheral flange is sized to form a seal between the lid and the vessel when the lid is attached to the vessel.

5. The vessel of claim 4 wherein the peripheral flange is sized to maintain the lid attached to the vessel during dispensing of contents from the vessel.

6. The vessel of claim 5 wherein the peripheral flange is sized to maintain the lid attached to the vessel when the vessel is rotated about a center horizontal axis of the handle in excess of 90°.

7. The vessel of claim 1 wherein each pour spout provides an opening defined by the point of attachment of the pouring surface to the side wall, the opening providing fluid communication between the interior of the vessel and the pouring surface.

8. The vessel of claim 1 wherein an area of the side wall defined by the point of attachment of the pouring surface to the side wall includes a plurality of perforations, the plurality of perforations providing fluid communication between the interior of the vessel and the pouring spout.

9. The vessel of claim 1 wherein the side wall includes a convex shape and a circular cross-section.

10. The vessel of claim 1 wherein the side wall includes an annular shape and a circular cross-section.

11. A vessel comprising:
    a bottom surface;
    an upstanding peripheral side wall that extends upward from the bottom surface having a diameter;
    a pour spout joined to the side wall, the pour spout having a pouring surface that extends outwardly from and peripherally about the side wall from a point of attachment to the side wall to define a depth;
    a handle joined to the side wall at about 90° from the pour spout; and
    a removable lid including
       a top surface,
       a knob centrally joined to the top surface for grasping the lid,
       an annular peripheral flange extending downwardly from a perimeter edge of the top surface for a predetermined distance, the peripheral flange being sized and configured to be telescopically received within the side wall of the vessel, and
       a lateral extension extending laterally from the top surface, the lateral extension being sized and configured such that when the lid is attached to the vessel the lateral extension can cover an area defined by an upper rim of the pouring surface.

12. The vessel of claim 11 wherein the lid further comprises an annular seating ridge at an intersect of the top surface and the peripheral flange to seat the lid on the rim portion of the vessel when the lid is attached to the vessel.

13. The vessel of claim 11 wherein the peripheral flange is sized to lay flush against an inner perimeter of the rim portion of the vessel when the lid is attached to the vessel.

14. The vessel of claim 11 wherein the peripheral flange is sized to form a seal between the lid and the vessel when the lid is attached to the vessel.

15. The vessel of claim 11 wherein the peripheral flange is sized to maintain the lid attached to the vessel during dispensing of contents from the vessel.

16. The vessel of claim 11 wherein the peripheral flange is sized to maintain the lid attached to the vessel when the vessel is rotated about a center horizontal axis of the handle in excess of 90°.

17. The vessel of claim 11 wherein each pour spout provides an opening defined by the point of attachment of the pouring surface to the side wall, the opening providing fluid communication between the interior of the vessel and the pouring surface.

18. The vessel of claim 11 wherein an area of the side wall defined by the point of attachment of the pouring surface to the side wall includes a plurality of perforations, the plurality of perforations providing fluid communication between the interior of the vessel and the pouring spout.

19. The vessel of claim 11 wherein the side wall includes a convex shape and a circular cross-section.

20. The vessel of claim 11 wherein the side wall includes an annular shape and a circular cross-section.

* * * * *

UNITED STATES PATENT AND TRADEMARK OFFICE
CERTIFICATE OF CORRECTION

PATENT NO.    : 6,520,383 B1  
DATED         : February 18, 2003  
INVENTOR(S)   : Iris Brest Page 1 of 1

It is certified that error appears in the above-identified patent and that said Letters Patent is hereby corrected as shown below:

Column 9,  
Line 61, change "provides" to -- defines --.

Column 10,  
Line 53, change "provides" to -- defines --.

Signed and Sealed this

Eighth Day of April, 2003

JAMES E. ROGAN  
*Director of the United States Patent and Trademark Office*